United States Patent
Brake et al.

(10) Patent No.: US 10,978,043 B2
(45) Date of Patent: Apr. 13, 2021

(54) TEXT FILTERING BASED ON PHONETIC PRONUNCIATIONS

(71) Applicant: International Business Machines Corporation, Armonk, NY (US)

(72) Inventors: Kyle M. Brake, Dublin, OH (US); Stanley J. Vernier, Grove City, OH (US); Stephen A. Boxwell, Columbus, OH (US); Keith G. Frost, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 16/149,044

(22) Filed: Oct. 1, 2018

(65) Prior Publication Data

US 2020/0105246 A1 Apr. 2, 2020

(51) Int. Cl.
| | |
|---|---|
| *G06F 40/10* | (2020.01) |
| *G10L 13/08* | (2013.01) |
| *G10L 13/04* | (2013.01) |
| *G06F 16/335* | (2019.01) |
| *G10L 15/26* | (2006.01) |
| *G10L 13/00* | (2006.01) |
| *G10L 15/08* | (2006.01) |

(52) U.S. Cl.
CPC ............ *G10L 13/08* (2013.01); *G06F 16/335* (2019.01); *G10L 13/04* (2013.01); *G10L 15/26* (2013.01); *G06F 40/10* (2020.01); *G10L 13/00* (2013.01); *G10L 15/08* (2013.01)

(58) Field of Classification Search
CPC ......... G06F 40/10; G10L 13/00; G10L 15/26; G10L 15/08
See application file for complete search history.

(56) References Cited

U.S. PATENT DOCUMENTS

| | | | |
|---|---|---|---|
| 7,174,295 B1 * | 2/2007 | Kivimaki | G06F 40/117 704/260 |
| 7,437,290 B2 * | 10/2008 | Danieli | G10L 15/08 704/251 |
| 8,121,845 B2 | 2/2012 | Kirby | |
| 8,831,953 B2 | 9/2014 | Vanjani | |
| 2006/0031870 A1 | 2/2006 | Jarman et al. | |

(Continued)

FOREIGN PATENT DOCUMENTS

| | | | | |
|---|---|---|---|---|
| CA | 2816920 A1 * | 6/2012 | ............ | G06F 16/40 |
| GB | 2449742 | 12/2008 | | |

OTHER PUBLICATIONS

Park et al., "A Study on the Audio Comparison Expletive Filtering System using TTS," Indian Journal of Science and Technology, vol. 9(S1), Dec. 2016, 6 pages.

*Primary Examiner* — Feng-Tzer Tzeng
(74) *Attorney, Agent, or Firm* — Vanleeuwen & Vanleeuwen; Feb R. Cabrasawan

(57) ABSTRACT

An approach is provided in which an information handling system converts a first set of text to synthesized speech using a text-to-speech converter. The information handling system then converts the synthesized speech to a second set of text using a speech-to-text converter. In response to converting the synthesized speech to the second set of text, the information handling system analyzes the second set of text against a filtering criterion and prevents usage of the synthesized speech based on the analysis.

17 Claims, 6 Drawing Sheets

(56) References Cited

U.S. PATENT DOCUMENTS

| | | | |
|---|---|---|---|
| 2008/0294439 A1* | 11/2008 | Kirby | G10L 15/26 704/251 |
| 2009/0100523 A1* | 4/2009 | Harris | H04L 51/12 726/26 |
| 2013/0238318 A1* | 9/2013 | Enoki | G06F 40/284 704/9 |
| 2014/0278367 A1 | 9/2014 | Markman et al. | |
| 2015/0039293 A1 | 2/2015 | Viswanathan et al. | |

* cited by examiner

TEXT FILTERING BASED ON PHONETIC PRONUNCIATIONS

BACKGROUND

Speech synthesis is the artificial production of human speech using a speech synthesizer that is implemented in software or hardware products. A text-to-speech (TTS) converter converts normal language text into speech, or renders symbolic linguistic representations (e.g., phonetic transcriptions) into speech. Internet services use text-to-speech converters to convert text into speech for various applications such as streaming donation messages.

Internet services typically use profanity filters in text-to-speech environments that automatically scan user posts or comments as they are submitted and automatically changes or censors particular words or phrases. Expletives are typically partially replaced, completely replaced, or replaced by nonsense words. This relieves administrators or moderators of the task of constantly patrolling incoming text for inappropriate language. In a text-to-speech environment, however, malicious users submit messages that in-place profanity filters determines are non-offensive, but become verbally offensive when pronounced through text-to-speech technology. For example, streaming services read donation messages aloud and creative donators often create offensive language through the phonetic pronunciations of a combination of non-offensive words.

BRIEF SUMMARY

According to one embodiment of the present disclosure, an approach is provided in which an information handling system converts a first set of text to synthesized speech using a text-to-speech converter. The information handling system then converts the synthesized speech to a second set of text using a speech-to-text converter. In response to converting the synthesized speech to the second set of text, the information handling system analyzes the second set of text against a filtering criterion and prevents usage of the synthesized speech based on the analysis.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
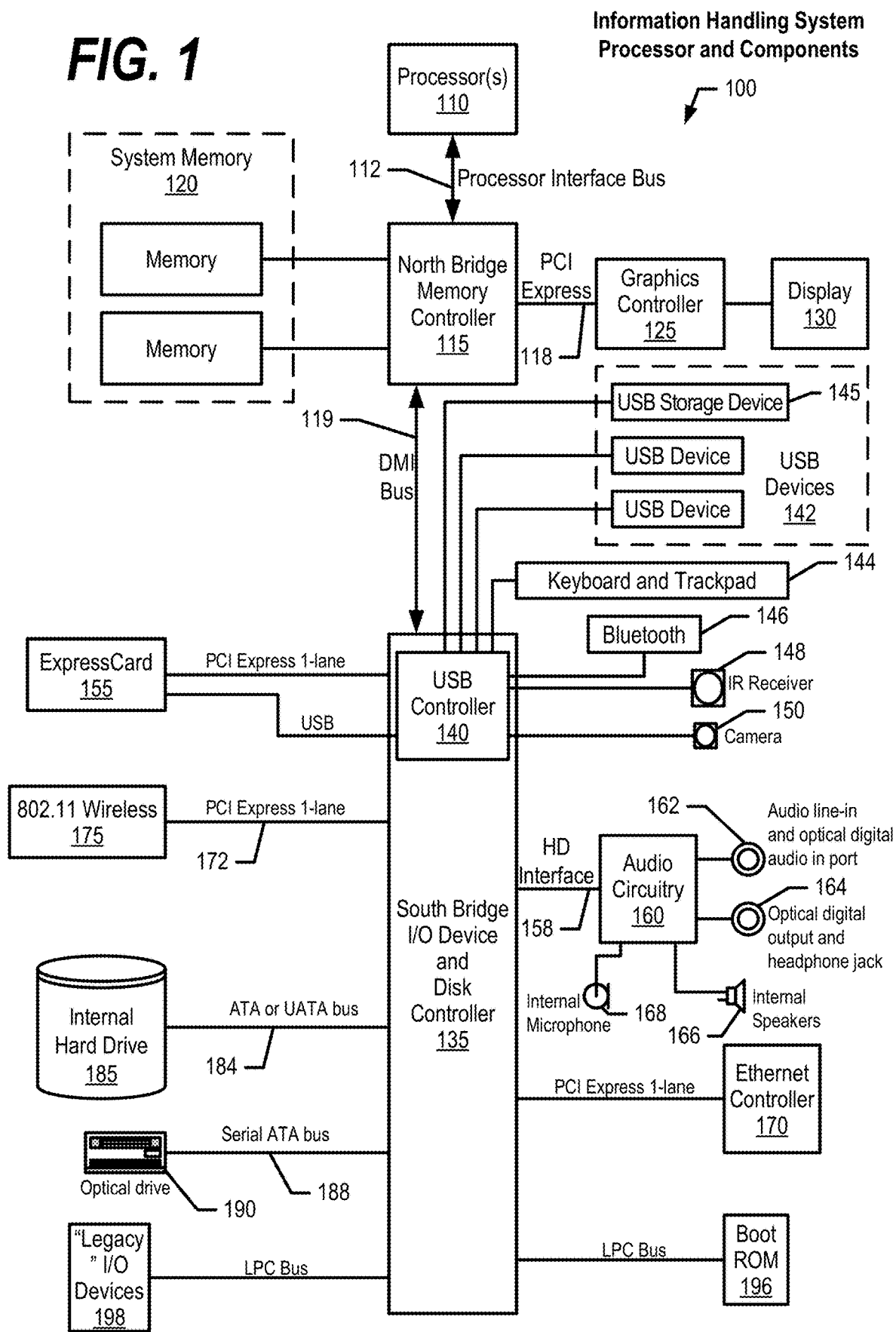
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
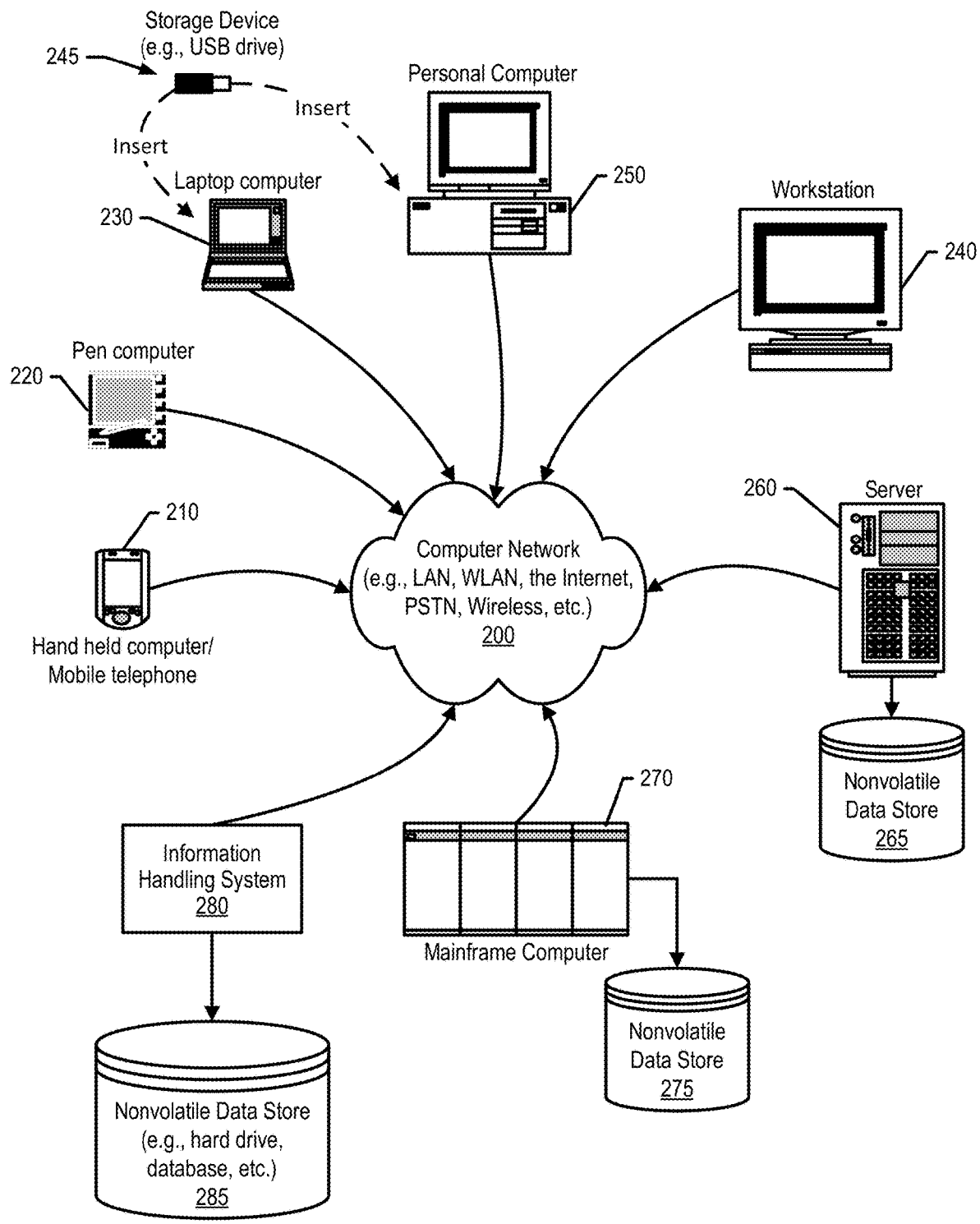
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 6 depict an approach that can be executed on an information handling system to filter text based on phonetic pronunciations. As discussed earlier, offensive language can trick in-place profanity filters by being non-offensive text-wise but become verbally offensive when pronounced through text-to-speech technology. The information handling system described herein resolves this issue by converting incoming text to synthesized speech (phonetic pronunciation of the incoming text), converting the synthesized speech back to textual form (textual representation of the phonetic pronunciation), and then analyzing the converted text against a list of prohibited words and phrases. When a match is found between the prohibited list and the converted text, the information handling system prevents the synthesized speech from being broadcast and informs an administrator accordingly.

Figure 3:
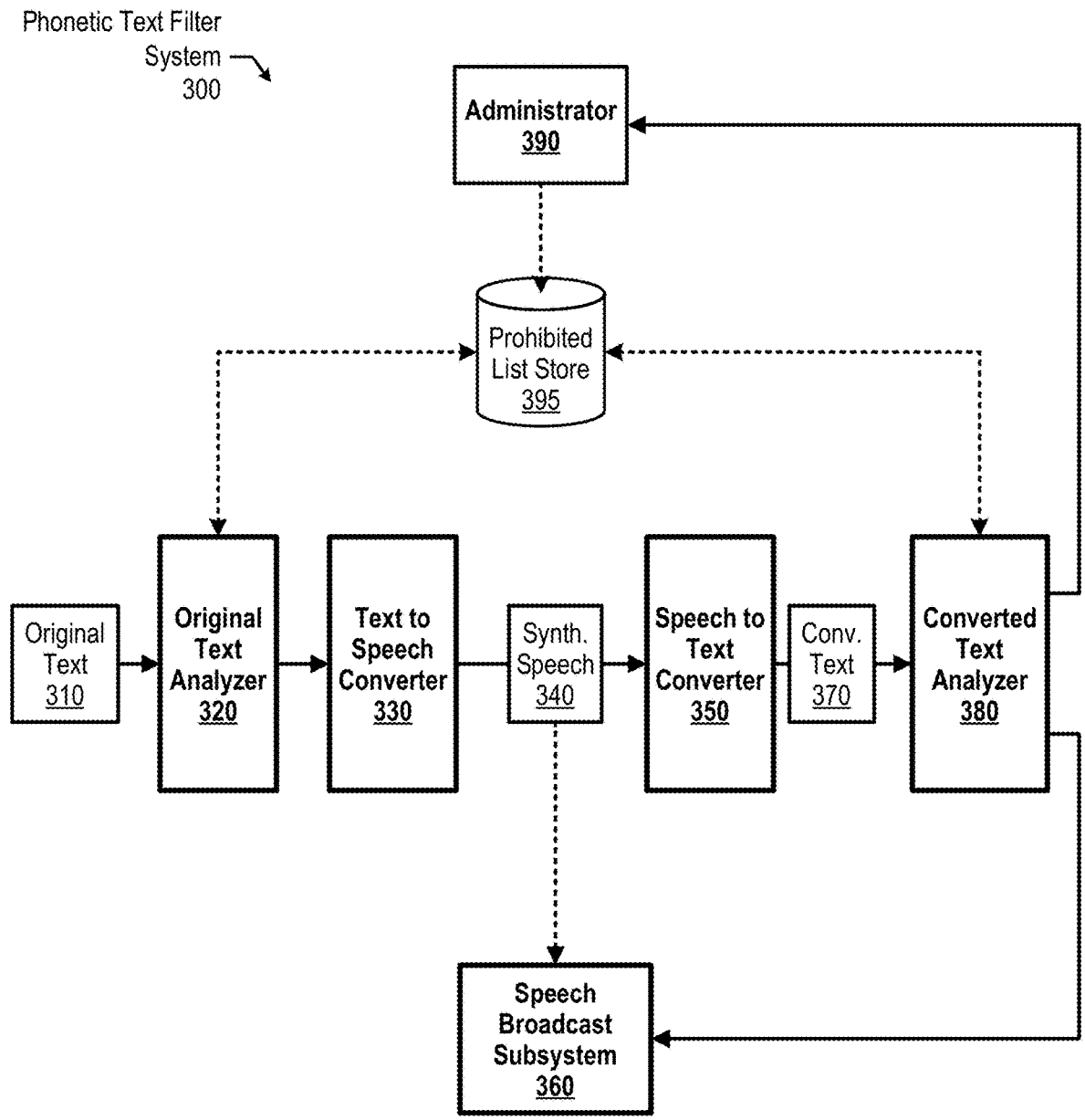
FIG. 3 is an exemplary diagram that depicts a phonetic text filter system performing various data conversions and determining whether to broadcast content based on analyzing the data conversions.

FIG. 3 is an exemplary diagram that depicts a phonetic text filter system performing various data conversions and determining whether to broadcast content based on analyzing the data conversions. Phonetic text filter system 300 receives original text 310 from a source, such as a streaming service. Original text 310 is text in a form such as a text message, a page of text, a document, etc.

Original text analyzer 320 analyzes original text 310 against a prohibited list of words/phrases in prohibited list store 395. The prohibited list includes words and or phrases that are considered inappropriate and/or offensive, in one embodiment, to the general public. The prohibited list, in one embodiment, is generated based on evaluating traditional sources and social media to determine which words/phrases are considered inappropriate or offensive (see FIG. 6 and corresponding text for further details). In another embodiment, administrator 390 builds the prohibited list based on administrator 390's experience.

When original text analyzer 320 determines that original text 310 does not include words/phrases matching the prohibited list, original text analyzer 320 sends original text 310 to text-to-speech converter 330. Text-to-speech converter 330 converts original text 310 to synthesized speech 340, which is the phonetic pronunciation of original text 310. Speech-to-text converter 350 then converts synthesized speech 340 into converted text 370.

Converted text analyzer 380 compares converted text 370 against the prohibited list in prohibited list store 395 to determine whether converted text 370 includes inappropriate/offensive words/phrases. If a match is not found, converted text analyzer instructs speech broadcast subsystem 360 to broadcast synthesized speech 340. However, if a match is found, indicating that synthesized speech 340 or a portion thereof sounds like an inappropriate word/phrase, converted text analyzer 380 prevents speech broadcast subsystem 360 from broadcasting synthesized speech 340. Converted text analyzer 380 also notifies administrator 390, whereupon administrator determines whether to add original text 310 or a portion thereof to the prohibited list in prohibited list store 395 (see FIG. 4 and corresponding text for further details). In one embodiment, converted text analyzer 380 instructs speech broadcast subsystem 360 to broadcast a portion of synthesized speech 340 that is not considered offensive or inappropriate.

Figure 4:
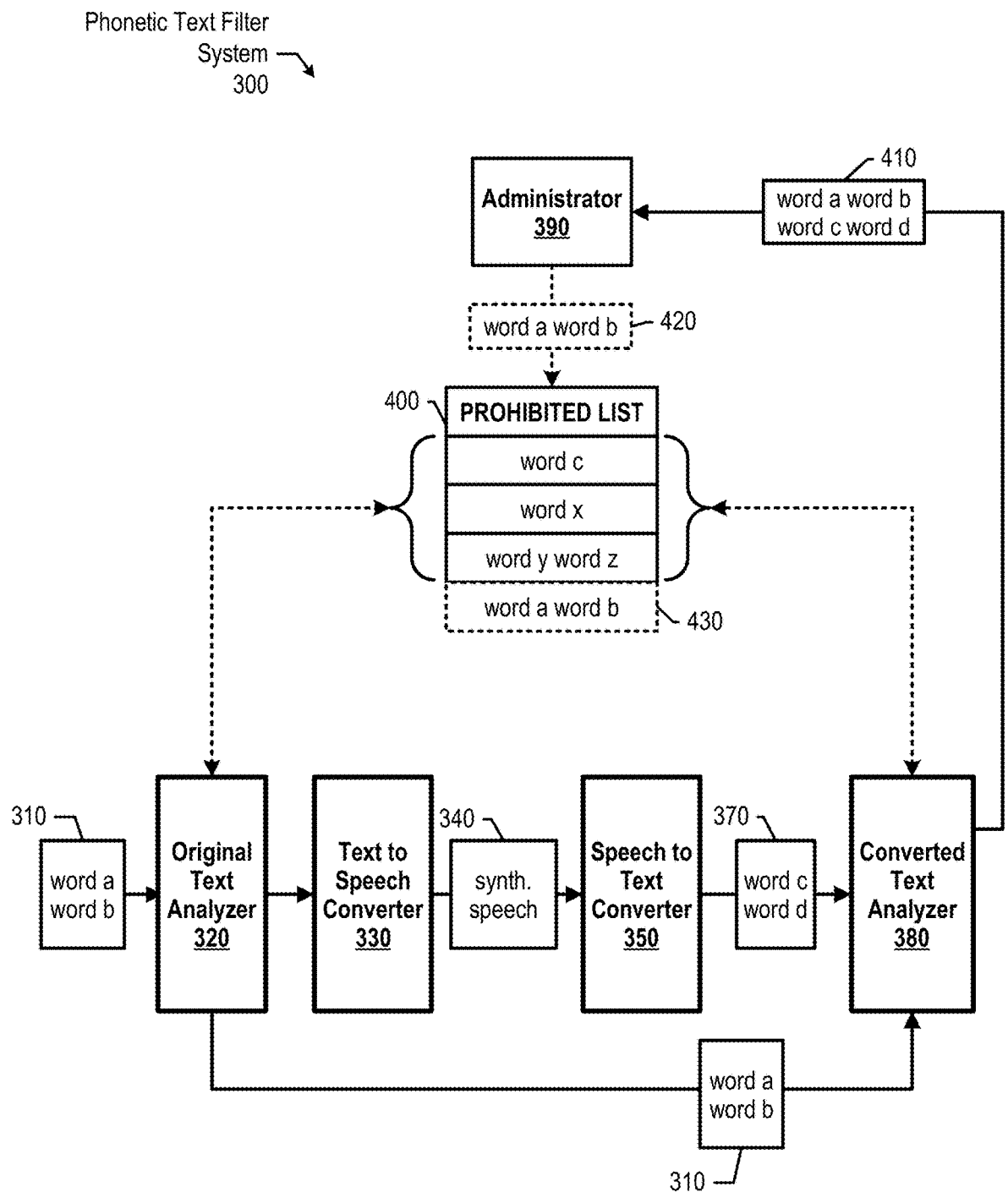
FIG. 4 is an exemplary diagram that depicts the phonetic text filter system detecting original text that is phonetically inappropriate or offensive.

FIG. 4 is an exemplary diagram that depicts the phonetic text filter system detecting original text that is phonetically inappropriate or offensive. Original text 310 includes the phrase with two words "word a word b." Original text analyzer 320 compares word a and word b against the initial entries in prohibited list 400, which includes word c, word x, and the phrase word y word z. Because word a and word b do not match any of the initial entries, original text analyzer 320 sends word a word b to text-to-speech converter 330, which generates synthesized speech 340 and is the phonetic pronunciation of "word a word b."

Speech-to-text converter 350 converts synthesized speech 340 to converted text 370, which is "word c word d." Converted text analyzer 380 compares converted speech 370 to the initial entries in prohibited list 400 and determines that word c in converted text 370 matches one of the initial entries. In turn, in one embodiment, converted text analyzer 380 retrieves original text 310 from original text analyzer 320 and sends message 410 to administrator 390. Message 410 includes original text 310 (word a word b) and converted text 370 (word c word d). In another embodiment, administrator 390 retrieves original text 310 from, for example, original text analyzer 320.

When administrator 390 determines that the combination "word a word b" when spoken are phonetically inappropriate or offensive, administrator 390 adds "word a word b" 420 as entry 430 to prohibited list 400. In turn, original text analyzer 320 matches subsequent word a word b phrases against entry 430 and discards the subsequent "word a word b" phrase accordingly.

Figure 5:
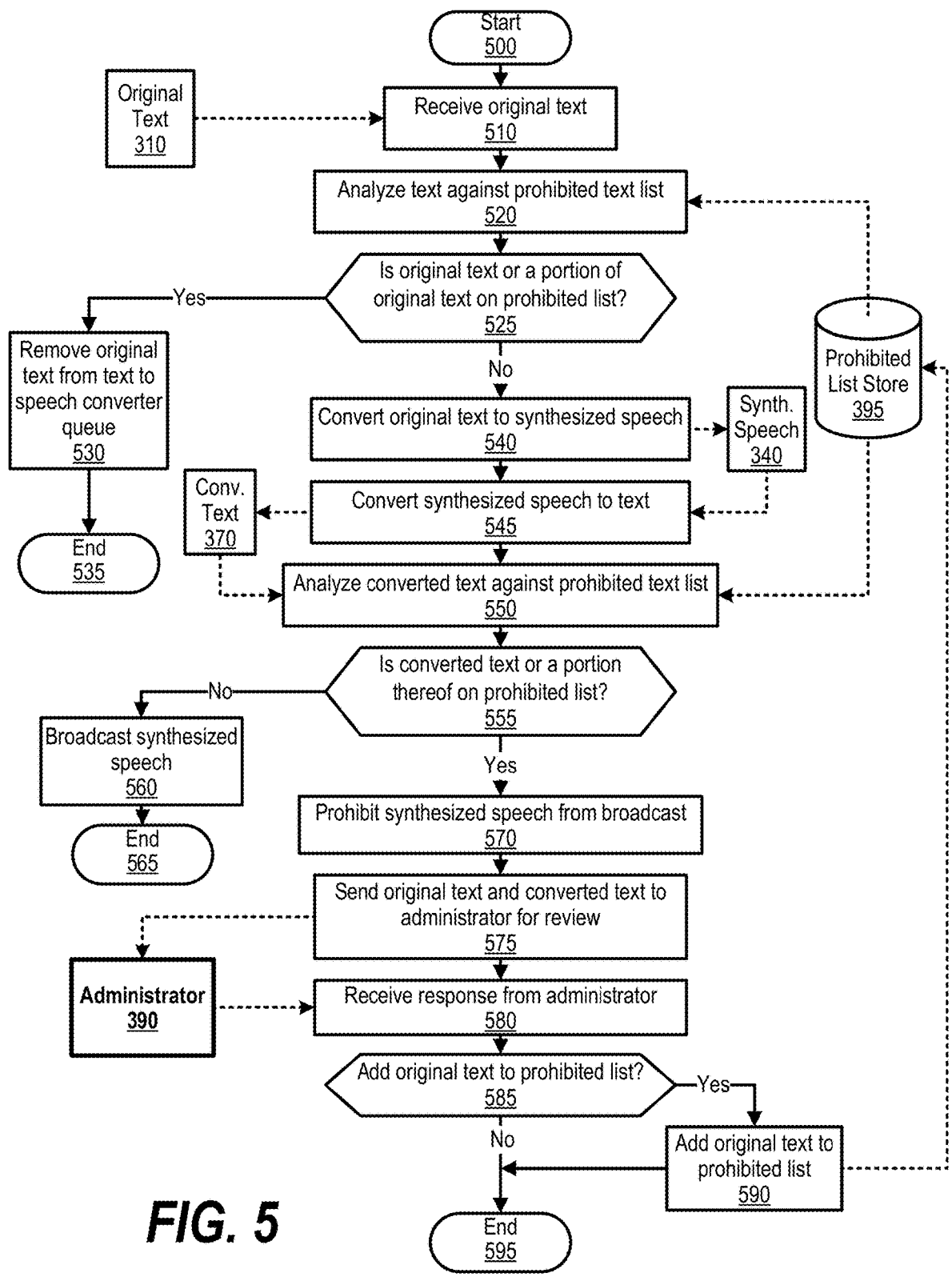
FIG. 5 is an exemplary flowchart showing steps taken to prevent broadcasting synthesized speech based on the synthesized speech's phonetic pronunciation.

FIG. 5 is an exemplary flowchart showing steps taken to prevent broadcasting synthesized speech based on the synthesized speech's phonetic pronunciation. FIG. 5 processing commences at 500 whereupon, at step 510, the process receives original text 310, such as from a streaming service.

At step 520, the process analyzes original text 310 against a prohibited text list in prohibited list store 395. As discussed earlier, the prohibited text list includes single word entries and multi-word entries that are considered prohibited based on their actual meaning or their phonetic pronunciation that is similar to a prohibited word.

The process determines as to whether the original text, or a portion of the original text, is on prohibited list (decision 525). For example, original text 310 may include five words and one of the words is on the prohibited list. If the original text or a portion of the original text is on the prohibited list, then decision 525 branches to the 'yes' branch. At step 530, the process removes original text 310 from a text-to-speech converter queue to prevent the original text from being converted to synthesized speech. In one embodiment, the process removes the prohibited text from original text 310 and further processes the non-prohibited text starting at step 540. FIG. 5 processing thereafter ends at 535.

On the other hand, if the original text or a portion of the original text is not on the prohibited list, then decision 525 branches to the 'no' branch whereupon, at step 540, the process converts original text 310 to synthesized speech 340 using text-to-speech converter 330. At step 545, the process then converts the synthesized speech to converted text 370 using speech-to-text converter. This two-step conversion process enables the process to evaluate the phonetic pronunciation of original text 310 by converting it to synthesized speech and then converting it back to text based on the sound of the synthesized speech. In other words, the process evaluates the phonetic pronunciation of original text 310 through evaluation of converted text 370 because original text 310 and converted text 370 are phonetically similar.

At step 550, the process analyzes converted text 370 against the prohibited text list. The process determines as to whether the converted text or a portion thereof is on the prohibited list (decision 555). If is the converted text or a portion thereof is not on the prohibited list, then synthesized speech 340 is free from prohibited audio content and decision 555 branches to the 'no' branch. At step 560, the process broadcasts synthesized speech via speech publication system 360 and FIG. 5 processing thereafter ends at 565.

On the other hand, if converted text 370 or a portion thereof is on the prohibited list, indicating that the phonetic pronunciation of original text 310 sounds like a prohibited word, then decision 555 branches to the 'no' branch. At step 570, the process prohibits synthesized speech 340 from being broadcast and, at step 575, the process sends original text 310 and converted text 370 to administrator 390 for review.

At step 580, the process receives a response from the administrator indicating instructions on handling original text 310 in the future. The process determines as to whether administrator 390 wishes to add original text 310 (the tagged offensive portion) to prohibited list (decision 585). For example, original text 310 includes two words that when spoken separately do not insinuate an inappropriate word, but when spoken together sound like an inappropriate word or phrase.

If administrator 390 requests to add original text 310 to the prohibited list, then decision 585 branches to the 'yes' branch whereupon, at step 590, the process adds original text 310 to the prohibited list (see FIG. 4, 430, and corresponding text for further details). On the other hand, if administrator 390 does not request to add the original text to the prohibited list, then decision 585 branches to the 'no' branch bypassing step 590 and FIG. 5 processing thereafter ends at 595.

Figure 6:
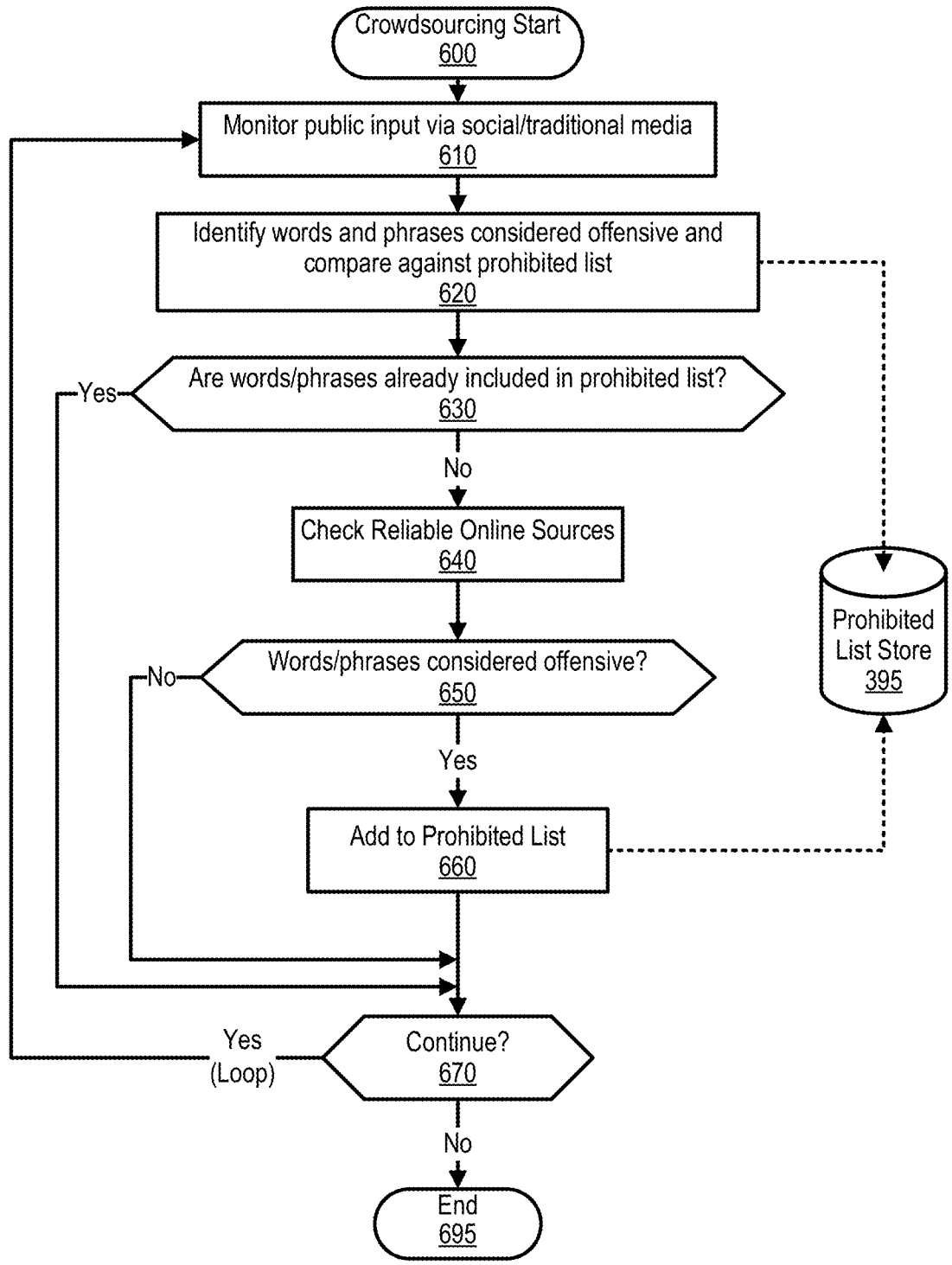
FIG. 6 is an exemplary flowchart showing steps taken to capture prohibited words and phrases based on public opinion.

FIG. 6 is an exemplary flowchart showing steps taken to capture prohibited words and phrases based on public opinion. FIG. 6 processing commences at 600 whereupon, at step 610, the process monitors public input via social media and traditional media and analyzes the input against various criterion such as keywords that indicate certain words are offensive (e.g., "inappropriate," "unsuitable," "improper,", etc.).

At step 620, the process identifies the words and phrases considered offensive and compares them against the words/phrases already included in the prohibited list. A determination is made as to whether the words/phrases are included in the prohibited list (decision 630). If the words/phrases are already in the prohibited list, then decision 630 branches to the 'yes' branch.

On the other hand, if the words/phrases are not currently included in the prohibited list, decision 630 branches to the 'no' branch, whereupon processing checks, in one embodiment, reliable online sources at step 640 to gather information as to whether the words/phrases could be considered as offensive (decision 650). For example, processing may access a reliable public dictionary to identify the context in which a word/phrase is utilized. If the online sources indicate that the word/phrase is offensive, decision 650 branches to the 'yes' branch, whereupon the word/phrase is added to the prohibited list at step 660. On the other hand, if the online source does not indicate that the word/phrase is offensive, decision 650 branches to the 'no' branch bypassing step 660.

A determination is made as to whether to continue to monitor public input and update the prohibited list accordingly (decision 670). If processing should continue, decision 670 branches to the "Yes" branch, which loops back to receive and process more words/phrases from the public. This looping continues until processing should terminate, at which point decision 670 branches to the "No" branch whereupon FIG. 6 processing ends at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
    determining whether a first set of text passes a filtering criterion; and
    in response to determining that the first set of text passes the filtering criterion:
        converting the first set of text to synthesized speech using a text-to-speech converter;
        converting the synthesized speech to a second set of text using a speech-to-text converter;
        analyzing the second set of text against a filtering criterion; and
        preventing usage of the synthesized speech in response to determining, during the analyzing, that at least a portion of the second set of text fails the filtering criterion.

2. The method of claim 1 further comprising:
    adding the first set of text to the filtering criterion in response to preventing usage of the synthesized speech.

3. The method of claim 1 wherein the first set of text is phonetically similar to the second set of text, and wherein the first set of text is different than the second set of text.

4. The method of claim 1 wherein the second set of text comprises a plurality of words, the method further comprising:
    preventing the usage of the synthesized speech in response to determining that at least one of the plurality of words matches a prohibited word in the filtering criterion.

5. The method of claim 1 further comprising:
    broadcasting the synthesized speech in response to determining that the second set of text passes the filtering criterion.

6. The method of claim 1 further comprising:
    identifying a set of prohibited words that are considered offensive based on social media sentiment; and
    adding the set of prohibited words to the filtering criterion.

7. An information handling system comprising:
    one or more processors;
    a memory coupled to at least one of the processors;
    a set of computer program instructions stored in the memory and executed by at least one of the processors in order to perform actions of:
        determining whether a first set of text passes a filtering criterion; and
        in response to determining that the first set of text passes the filtering criterion:
            converting the first set of text to synthesized speech using a text-to-speech converter;
            converting the synthesized speech to a second set of text using a speech-to-text converter;
            analyzing the second set of text against a filtering criterion; and
            preventing usage of the synthesized speech in response to determining, during the analyzing, that at least a portion of the second set of text fails the filtering criterion.

8. The information handling system of claim 7 wherein the processors perform additional actions comprising:
    adding the first set of text to the filtering criterion in response to preventing usage of the synthesized speech.

9. The information handling system of claim 7 wherein the first set of text is phonetically similar to the second set of text, and wherein the first set of text is different than the second set of text.

10. The information handling system of claim 7 wherein the second set of text comprises a plurality of words, the processors performing additional actions comprising:
    preventing the usage of the synthesized speech in response to determining that at least one of the plurality of words matches a prohibited word in the filtering criterion.

11. The information handling system of claim 7 wherein the processors perform additional actions comprising:

broadcasting the synthesized speech in response to determining that the second set of text passes the filtering criterion.

12. The information handling system of claim 7 wherein the processors perform additional actions comprising:
   identifying a set of prohibited words that are considered offensive based on social media sentiment; and
   adding the set of prohibited words to the filtering criterion.

13. A computer program product stored in a computer readable storage medium, comprising computer program code that, when executed by an information handling system, causes the information handling system to perform actions comprising:
   determining whether a first set of text passes a filtering criterion;
   in response to determining that the first set of text passes the filtering criterion:
      converting the first set of text to synthesized speech using a text-to-speech converter;
      converting the synthesized speech to a second set of text using a speech-to-text converter;
      analyzing the second set of text against a filtering criterion; and
      preventing usage of the synthesized speech in response to determining, during the analyzing, that at least a portion of the second set of text fails the filtering criterion.

14. The computer program product of claim 13 wherein the information handling system performs further actions comprising:
   adding the first set of text to the filtering criterion in response to preventing usage of the synthesized speech.

15. The computer program product of claim 13 wherein the first set of text is phonetically similar to the second set of text, and wherein the first set of text is different than the second set of text.

16. The computer program product of claim 13 wherein the second set of text comprises a plurality of words, the information handling system performing further actions comprising:
   preventing the usage of the synthesized speech in response to determining that at least one of the plurality of words matches a prohibited word in the filtering criterion.

17. The computer program product of claim 13 wherein the information handling system performs further actions comprising:
   broadcasting the synthesized speech in response to determining that the second set of text passes the filtering criterion.

* * * * *